Patented Nov. 23, 1926.

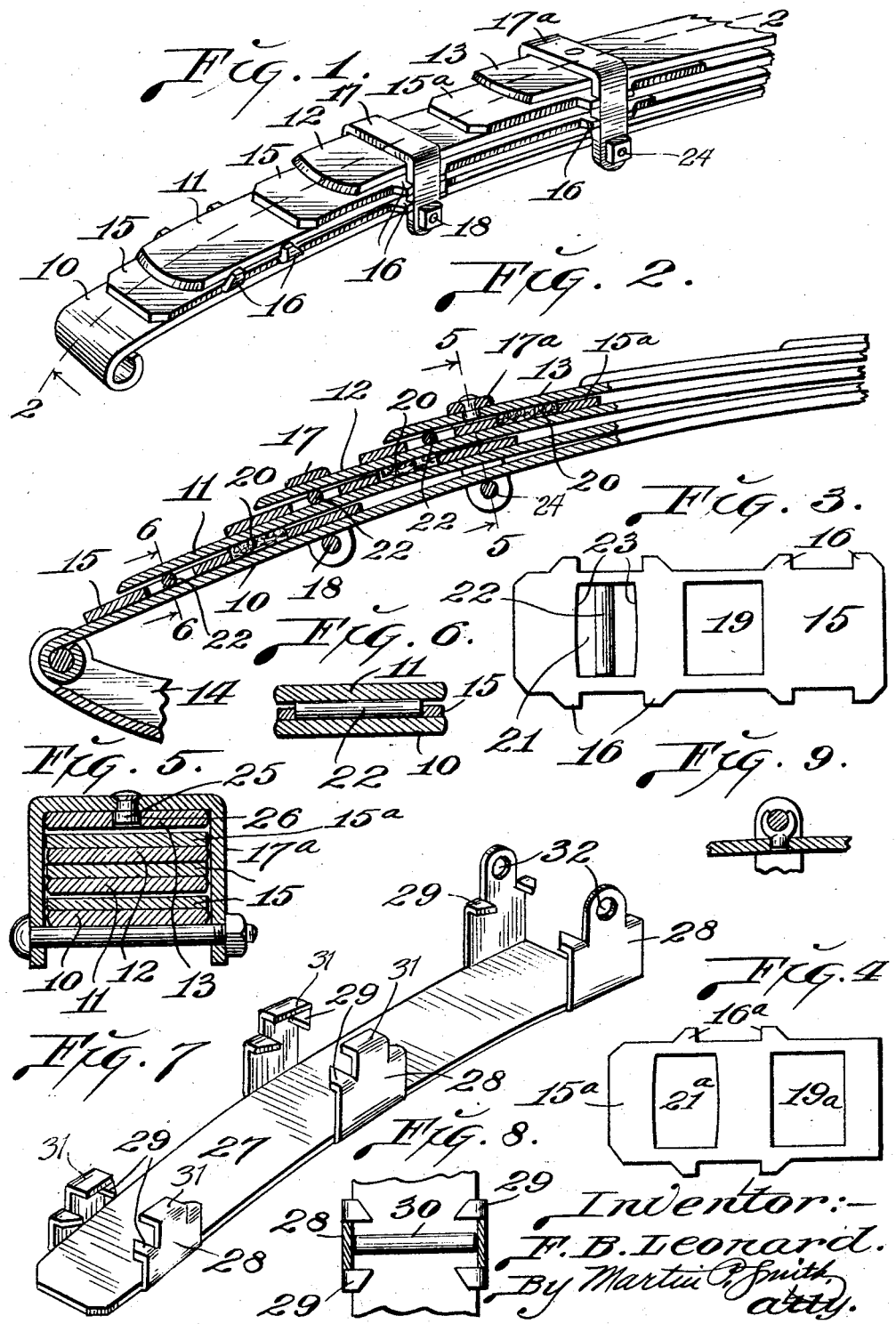

1,608,028

UNITED STATES PATENT OFFICE.

FRANK B. LEONARD, OF LOS ANGELES, CALIFORNIA.

ROLLER BEARING AND LUBRICATING-PAD HOLDER FOR LEAF SPRINGS.

Application filed December 26, 1923. Serial No. 682,608.

My invention relates generally to leaf springs of the type usually employed on motor vehicles and more particularly to a device that is adapted to be attached to a leaf spring and which serves the three-fold purpose of a spacer for the leaves of the spring, a holder for lubricant-carrying pads and as a retainer for anti-friction bearing members such as rollers that are disposed between the leaves of the spring.

The principal objects of my invention are, to provide a combined spacer, lubricant pad holder and roller-bearing retainer, that is of relatively simple structure, capable of being easily and cheaply produced, and which may be readily applied to, or removed from a leaf spring.

A further object of my invention is to provide a device of the character described that will be effective in retaining in proper operative positions between the leaves of a spring, a series of anti-friction rollers, as well as a series of lubricant containing pads and which provision, it will be understood, will materially increase the effectiveness of the spring, inasmuch as the rollers, acting between the leaves of the spring, minimize the friction that would otherwise be produced between the contacting faces of said leaves and the presence of lubricant between the leaves of the spring prevents the formation of rust and which result, combined with the anti-friction effect produced by the roller bearings, minimizes the tendency of the spring leaves to crystallize under continued action and consequently increases the life, or period of service of the spring to which the device is applied.

With the foregoing and other objects in view, my invention consists in certain novel features of construction and arrangement of parts that will be hereinafter more fully described and claimed and illustrated in the accompanying drawings in which—

Figure 1 is a perspective view of a portion of a leaf spring to which my improved device is applied.

Fig. 2 is an enlarged vertical section taken on the line 2—2 of Fig. 1.

Figs. 3 and 4 are plan views of the two different forms of spacing plates that are arranged between the leaves of the springs.

Fig. 5 is an enlarged cross section taken on the line 5—5 of Fig. 2.

Fig. 6 is an enlarged cross section taken on the line 6—6 of Fig. 2.

Fig. 7 is a perspective view of a modified form of my improved roller bearing and lubricating pad holding device.

Fig. 8 is a detail sectional view showing the means employed for holding the roller in the modified form of the device.

Fig. 9 is a detail section showing the means employed for effecting an interlock between the holder and the spring.

Referring by numerals to the accompanying drawings which illustrate a practical embodiment of my invention, 10, 11, 12 and 13 designate the leaves of a spring, of the type generally used on motor vehicles and the end of the lower leaf 10 being secured in the usual manner to the lower half of the spring or to a frame member such as 14.

Interposed between the end portions of the leaves 10 and 11 and 11 and 12 are spacing plates such as 15, of suitable metal, the thickness of which is approximately the same or slightly less than that of the spring leaves and the width of said plates and said leaves being practically equal.

Formed integral with each plate 15 and on the sides thereof, near both ends are pairs of spaced lugs 16 that are adapted to receive the legs of inverted U-shaped clips or shackles such as 17 and 17ª.

Inasmuch as the overlying springs are progressively shortened the spacing plate 15 that lies between the leaves 11 and 12 is inset with respect to the end of the spring and in relation to the plate that is positioned between leaves 10 and 11.

Thus the pairs of lugs 16 on the inner end portion of plate 15 that is inserted between leaves 10 and 11, are disposed in alignment with and below the pans of lugs on the outer end portion of the plate that is positioned between leaves 11 and 12 and the spaces between these aligned pairs of lugs receives the legs of the clip or shackle 17 and the latter being secured in position on the spring by a bolt 18 that passes through the lower ends of the legs of said clip beneath the lower leaf 10.

The pairs of lugs 16 on the outer portion of the plate that is positioned between leaves 10 and 11 may be bent upward against the side edges of leaf 11 as illustrated in Fig. 1.

Each plate 15 is provided intermediate its ends with an aperture 19, preferably square or rectangular and which is adapted to receive and retain an absorbent pad 20, preferably of fibrous material such as felt and which is "loaded" with lubricating oil, prior to the insertion of the plate between the spring leaves.

Formed in each plate 15 is a substantially rectangular aperture 21 that is for the reception of a transversely arranged auto friction bearing anti-friction bearing roller 22 of relatively hard wear-resisting metal.

The diameter of this roller is slightly greater than the thickness of the plate, so that when properly applied for use, the underface of the leaf that bears on top of the roller is maintained out of contact with the upper surface of the inserted plate 15.

The front and rear edges of each aperture 21 are made slightly concave or curved throughout its length so that if the roller that is positioned within the aperture occupies a position directly against either edge, the ends only of said roller have bearing against the spacing plate, thereby minimizing friction as said roller is rotated by movement of the spring leaves.

Positioned between leaves 12 and 13 is a relatively short spacing plate 15ª having a pad-receiving opening 19ª and an opening 21ª for an anti-friction roller.

This short plate has spaced lugs 16ª on its side edges that are in substantial vertical alignment with the rear or inner pairs of lugs on the plate that is positioned between leaves 11 and 12 and positioned between the aligned lugs are the legs of the clip or shackle 17ª.

Passing through the lower ends of this clip is bolt 24 and depending from the cross bar of said clip is a stud 25 that engages in an aperture 26 that is formed in leaf 13 for the reception of a similar stud that is carried by the clip that is usually placed on springs of this type.

When my improved device is properly applied to a spring and the latter is in action, there is a slight relative longitudinal movement between the leaves of the spring and, due to the presence of the rollers and the lubricating pads between said leaves, this relative movement is practically free and unrestricted with the result that the resiliency and riding qualities of the spring are greatly increased and said spring will resist and absorb shocks and vibration to a much greater degree than a spring that is not equipped with the roller bearings and lubricating means.

The relative movement between the leaves of the springs, sets up a pumping action that is effective in maintaining a thorough distribution of the lubricant from the pads 20 over the contacting surfaces of said leaves.

This effective lubrication of the spring and the roller bearings between the leaves thereof prevents the formation of rust, minimizes friction in those portions of the leaves that have the greatest movement in action and greatly increases the life of the spring, inasmuch as the tendency of the leaves to crystallize and break is reduced to a minimum.

In the modified construction illustrated in Figs. 7, 8 and 9, the roller-bearing retainer consists of an elongated plate 27 carrying on its side edges upstanding ears 28 and projecting inwardly from the latter are pairs of spaced ears 29 that occupy positions between the spring leaves and serve to retain in position between said leaves, rollers 30, as illustrated in Fig. 8.

This member 27 may be retained in position on the spring by bending the upper ends of the ears 28 over onto the top of the spring as indicated by 31, Fig. 7, or the upper ends of one or more pairs of the ears may be perforated to receive a bolt as designated by 32, Fig. 7.

Obviously when this form of device is used, the upper portions of the ears 28 must be bent outward a sufficient distance to permit said device to be moved from beneath the spring, upward into proper position thereupon.

Thus it will be seen that I have provided a leaf spring roller bearing and lubricating pad holder that is of relatively simple structure, capable of being easily and cheaply produced and which is very effective in performing its intended functions.

Obviously, minor changes in the size, form and construction of the various parts of my improved leaf spring roller and lubricating pad holder, may be made and substituted for those herein described without departing from the spirit of the invention, the scope of which is set forth in the appended claims.

I claim as my invention:

1. In a roller bearing and lubricating device for leaf springs, a plate adapted to be inserted between the leaves of a spring, said plate having a pair of openings, an anti-friction member arranged for rolling movement within one of said openings, an absorbent lubricant pad positioned in the other opening, and spaced lugs projecting from the side edges of said plate and adapted to receive the legs of a clip.

2. In a roller bearing and lubricating device for leaf springs, a plate adapted to be positioned between the leaves of a spring and provided with an opening, the oppositely disposed members of a pair of the edges of said opening being curved lengthwise so that the ends of said opening are narrower than the central portion thereof, and a roller loosely arranged within said opening and adapted to roll toward and away from the curved edges of said opening.

3. In a vehicle shock absorber, the combination of a spring including a plurality of superposed spring leaves, a retainer plate disposed intermediate adjacent leaves and formed with a rectangular opening, the transverse walls of the opening being concave, and an anti-friction roller disposed within the opening of the said retainer plate and having contact with adjacent leaves, said roller being adapted to engage either of said concave walls of the opening in the retainer plate and to have point contacts therewith adjacent the ends of the roller.

4. In a vehicle shock absorber, the combination of a spring including a plurality of superposed spring leaves, a retainer plate disposed intermediate adjacent leaves and formed with an opening, the transverse walls of the opening being concave, and an anti-friction roller disposed within the opening of the said retainer plate and having contact with adjacent leaves, said roller being adapted to engage either of said concave walls of the opening in the retainer plate and to have point contacts therewith adjacent the ends of the roller, the width of said opening in the retainer plate being greater than the diameter of the roller to permit of limited bodily movement of the latter.

5. In a vehicle shock absorber, the combination of a spring including a plurality of superposed spring leaves, a retainer plate disposed intermediate adjacent leaves and formed with an opening, an anti-frictional rolling element disposed within the opening of said retainer plate and having contact with said leaves, said retainer plate extending beyond the sides of the leaves, and a shackle surrounding said leaves and clamped against the sides of said retainer plate.

6. In a vehicle shock absorber, the combination of a spring including a plurality of superposed spring leaves, a retainer plate disposed intermediate adjacent leaves and formed with an opening, an anti-frictional roller element disposed within the opening of said retainer plate and having contact with said leaves, said retainer plate extending beyond the sides of the leaves, and a shackle surrounding said leaves and having interlocking connection with the sides of said retainer plate.

7. In a shock absorber, a retainer plate formed of sheet metal and adapted to be positioned between adjacent leaves of a vehicle spring including a plurality of superposed spring leaves, said plate being formed with an opening to receive an anti-frictional rolling element adapted to engage opposed faces of adjacent leaves, the transverse walls of the opening being concave.

In testimony whereof I affix my signature.

FRANK B. LEONARD.